United States Patent
Cho

(10) Patent No.: US 8,189,159 B2
(45) Date of Patent: May 29, 2012

(54) LIQUID CRYSTAL DISPLAY DEVICE AND METHOD FOR MANUFACTURING THE SAME

(75) Inventor: Suk-Ho Cho, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 519 days.

(21) Appl. No.: 12/499,247

(22) Filed: Jul. 8, 2009

(65) Prior Publication Data
US 2010/0157230 A1    Jun. 24, 2010

(30) Foreign Application Priority Data
Dec. 19, 2008 (KR) .................. 10-2008-0130087

(51) Int. Cl.
*G02F 1/1343* (2006.01)

(52) U.S. Cl. ............ 349/143; 349/187; 349/106; 349/38
(58) Field of Classification Search .................. 349/139, 349/143, 43, 38, 187, 106, 108, 48
See application file for complete search history.

(56) References Cited

U.S. PATENT DOCUMENTS 6,721,028 B2 * 4/2004 Kim et al. ..................... 349/141
7,612,854 B2 * 11/2009 Kang ............................ 349/141

* cited by examiner

*Primary Examiner* — Thoi Duong
(74) *Attorney, Agent, or Firm* — Birch, Stewart, Kolasch & Birch, LLP

(57) ABSTRACT

The present invention relates to a liquid crystal display, in which dim block caused by overlays is prevented at blue pixels having upside down inverted structures with respect to one another in a Z-type driving in which a signal is applied to data lines in zigzag.

10 Claims, 5 Drawing Sheets

LIQUID CRYSTAL DISPLAY DEVICE AND METHOD FOR MANUFACTURING THE SAME

CROSS REFERENCE TO RELATED APPLICATION

This application claims the benefit of the Patent Korean Application No. 10-2008-0130087, filed on Dec. 19, 2008, which is hereby incorporated by reference as if fully set forth herein.

BACKGROUND OF THE DISCLOSURE

1. Field of the Disclosure

The present invention relates to liquid crystal display devices, and more particularly, to a liquid crystal display device and a method for manufacturing the same, in which dim block caused by overlays is prevented at blue pixels having upside down inverted structures with respect to one another in a Z-type driving in which a signal is applied to data lines in zigzag.

2. Discussion of the Related Art

Currently, as information oriented times has come, the field of display which visually displays electric information signal has developed rapidly, and, to meet the development, various flat display devices with excellent features of thin, light weight, and low power consumption have been developed, and replace the present cathode ray tube CRT, rapidly.

As examples of the flat display devices, there are liquid crystal display device LCD, plasma display panel device PDP, field emission display device FED, electroluminescence display device ELD, and so on, all of which require a flat display panel essentially for displaying an image. The flat display panel has one pair of transparent insulating substrates bonded opposite to each other with a light emitting or polarizing material layer placed therebetween.

Of the flat display devices, the liquid crystal display device controls a light transmissivity of liquid crystals by using an electric field for displaying the image. For this, the image display device is provided with a display panel having liquid crystal cells, and a back light unit for directing a light to the display panel, and a driving circuit for driving the back light unit and the liquid crystal cells.

The display panel has a plurality of gate lines and a plurality of data lines formed to cross each other to define a plurality of pixel regions. Each of the pixel regions is provided with a thin film transistor array substrate and a color filter substrate arranged to face each other, spacers for maintaining a cell gap between the two substrates, and liquid crystals filled in the cell gap.

The thin film transistor array substrate is provided with the gate lines and the data lines, a thin film transistor formed at every crossing portion of the gate lines and the data lines as a switching device, a pixel electrode for each liquid crystal cell and connected to the thin film transistor, and an alignment film coated thereon. The gate lines and the data lines have signals applied thereto from relevant driving circuits through relevant pads.

The thin film transistor supplies a pixel voltage signal which is supplied to the data lines in response to a scan signal supplied to the gate line to the pixel electrode.

The color filter array substrate is provided with a color filter formed for each of the liquid crystal cells, a black matrix for definition of the color filters and reflection of external lights, a common electrode for supplying a reference voltage to the liquid crystal cells in common, and the alignment film coated thereon.

The thin film transistor substrate and the color filter array substrate fabricated separately thus are aligned, bonded to face each other, have liquid crystals injected therebetween, and sealed, to complete fabrication of the liquid crystal display panel.

The liquid crystal display device may have different adjacent pixel configurations depending on a driving system. The different pixel configurations cause problems coming from overlay.

A Z-type driving liquid crystal display device will be described with reference to the attached drawings.

FIG. 1 illustrates a circuitry diagram of a general Z-type driving liquid crystal display device.

Referring to FIG. 1, a Z-inversion type driving liquid crystal display device has a matrix of unit pixels, and R, G, B unit pixels therein form a pixel.

A pair of adjacent gate lines are formed in a first direction (transverse direction), spaced from each other by one unit pixel distance away.

Data lines are formed in a second direction perpendicular to the pair of gate lines spaced from each other by two unit pixel distances away in a longitudinal direction.

Thin film transistors are formed between gate lines and data lines different from each other at unit pixels on both sides of the data line.

The data line is formed at every second unit pixels, and the R, G, B unit pixels are repeated at every third unit pixels, wherein it can be known that the thin film transistor is arranged, not at the same positions for all the unit pixels of the same color, but in the same fashion repeatedly for every six pixels.

The six unit pixel has two R, G, B pixels respectively, wherein it can be known that positions of the thin film transistors for the two R unit pixels and two G unit pixels are, not only, different from each other in left side or right side thereof, but also positions of the thin film transistors for the B unit pixels are inverted both in an upper side and lower side, and in left side and right side.

Problems caused at the B unit pixels having the inverted pixel configuration will be reviewed.

FIG. 2 illustrates a plan view of common lines for the upper/lower side inverted pixels.

Referring to FIG. 2, the unit pixel on the left side has the thin film transistor formed between the gate line Gn and the data line Dm on a lower side, and the unit pixel on the right side has the thin film transistor formed between the gate line Gn−1 and the data line Dm+p on an upper side.

The common line 106a, 106b and 106c overlap at edges of the pixel electrodes 103a and 103b of the unit pixels between the pair of the gate lines, and are extended in a direction of the gate line, wherein storage capacitors are defined at regions the pixel electrodes 103a and 103b overlap, respectively. The common lines 106a and 106b at the unit pixels are connected with a common line connection portion 106c between the unit pixels, and extended to opposite sides like the gate lines for having a signal applied thereto.

In the meantime, if alignment between layers (particularly, between the common line and the pixel electrode) is accurate, an area of overlap between the common line 106a and the pixel electrode 103a at the right side pixel can be the same with an area of overlap between the common line 106b and the pixel electrode 103b at the left side pixel. However, if an upward or downward overlay takes place, to cause increase of an overlap area at one unit pixel and decrease of the overlap area at the other unit pixel resulting in decrease of storage capacitance, a difference of storage capacitance values between the unit pixels can become great, which causes dim block In this case, despite of the upper/lower inversion and left/right inversion, the pixels arranged side by side shown in FIG. 2 has an influence from upper/lower overlay relatively greater than an influence from left/right overlay. With regard to this, reviewing the drawing, an inference can be drawn that the dim block is caused by the difference of the storage capacitances of the pixels having a different configuration, as the common lines 106a and 106b overlap with the pixel electrodes 103a and 103b on both sides of left side and right side of the unit pixels respectively, and the common lines 106a and 106b overlap with the pixel electrodes 103a and 103b on one side of the unit pixels on an upper or lower side, respectively.

The general Z-type driving liquid crystal display device has the following problems.

In the Z-type driving liquid crystal display device, the R and G unit pixels have a left/right inverted pixel structure, and B unit pixel has upper/lower and left/right inverted structure.

In this case, due to configuration of the common lines overlap on left/right side of the pixel electrodes or on either upper side or lower side of the pixel electrode, the difference of storage capacitances for the B pixel lines of the upper/lower inverted pixel structure becomes great, to cause the dim block of the blue pixels.

SUMMARY OF THE DISCLOSURE

Accordingly, the present invention is directed to a liquid crystal display device and a method for manufacturing the same.

An object of the present invention is to provide a liquid crystal display device and a method for manufacturing the same which can prevent dim block from taking place by an overlay in blue pixels having an inverted configuration in a Z-type driving in which a signal is applied to data lines in zigzag.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a liquid crystal display device includes: a substrate having a matrix of pixel regions; a plurality of gate line pairs each having a first gate line and a second gate line in a first direction, wherein a previous line of the second gate line and a current line of the first gate line are spaced by one pixel region away; a plurality of data lines in a second direction, crossing the first direction at every two pixel regions; a first thin film transistor at a first pixel region between the data lines and the current line of the first gate line; a second thin film transistor formed at a second pixel region between the data lines and the previous line of the second gate line; a first pixel electrode formed at the first pixel region connected to the first thin film transistor, having a first neck portion projected therefrom toward the first gate line; a second pixel electrode formed at the second pixel region connected to the second thin film transistor, having a second neck portion projected therefrom toward the second gate line; and a common line overlapped with an edge of the first pixel electrode and second pixel electrode to form a closed loop at each first pixel electrode and second pixel electrode, having a connection portion connected between the first and second pixel electrodes.

The first neck portion and the second neck portion are extended beyond the common line.

The first neck portion and the second neck portion have the same widths at portions the first neck portion and the second neck portion cross the common line.

The first neck portion and the second neck portion have a width of 8~12 μm at portions the first neck portion and the second neck portion cross the common line.

The first thin film transistor has an electric contact portion with the first neck portion, and the second thin film transistor has an electric contact portion with the second neck portion.

The first pixel electrode and the second pixel electrode are designed to overlap with the common line on left/right sides thereof by the same width, and overlap with the common line on upper/lower sides thereof by the same width except the first and second neck portions.

The first and second pixel regions are for pixels of the same color.

The plurality of pixel regions have red, green, blue repetitive lines in the second direction, and the blue pixels are formed at the first and second pixel regions.

In another aspect of the present invention, a method for manufacturing a liquid crystal display device includes the steps of: providing a substrate having a matrix of pixel regions; forming a plurality of gate line pairs each having a first gate line and a second gate line in a first direction on the substrate, wherein a previous line of the second gate line and a current line of the first gate line are spaced by one pixel region away, and a plurality of common lines each having close loop patterns with respect of pixel regions between the previous first gate line and the current gate line and a connection portion connected between the closed loop patterns; depositing a gate insulating film on the substrate having the plurality of gate line pairs and the common line; forming a plurality of data lines at every two pixel regions in the second direction crossing the first direction, a first thin film transistor at a first pixel region between the data lines and the current first gate line, and a second thin film transistor at a second pixel region between the data lines and the previous second gate line, by removing a semiconductor layer and a second metal on the gate insulating film selectively; forming a protective film on the gate insulating film having the data line, first and second thin film transistors; depositing a transparent electrode on the protective film and removing the transparent electrode selectively, to form a first pixel electrode at the first pixel region having a first neck portion projected toward the first gate line, and a second pixel electrode at the second pixel region having a second neck portion projected toward the second gate line.

After forming the protective film on an entire surface of the substrate in the step of forming a protective film, further comprising the step of removing the protective film to expose the first thin film transistor and the second thin film transistor overlapped with the first and second neck portions, to form first and second contact holes.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DESCRIPTION OF SPECIFIC EMBODIMENTS

Reference will now be made in detail to the specific embodiments of the present invention, examples of which are illustrated in the accompanying drawings. Wherever possible, the same reference numbers will be used throughout the drawings to refer to the same or like parts.

Figure 3:
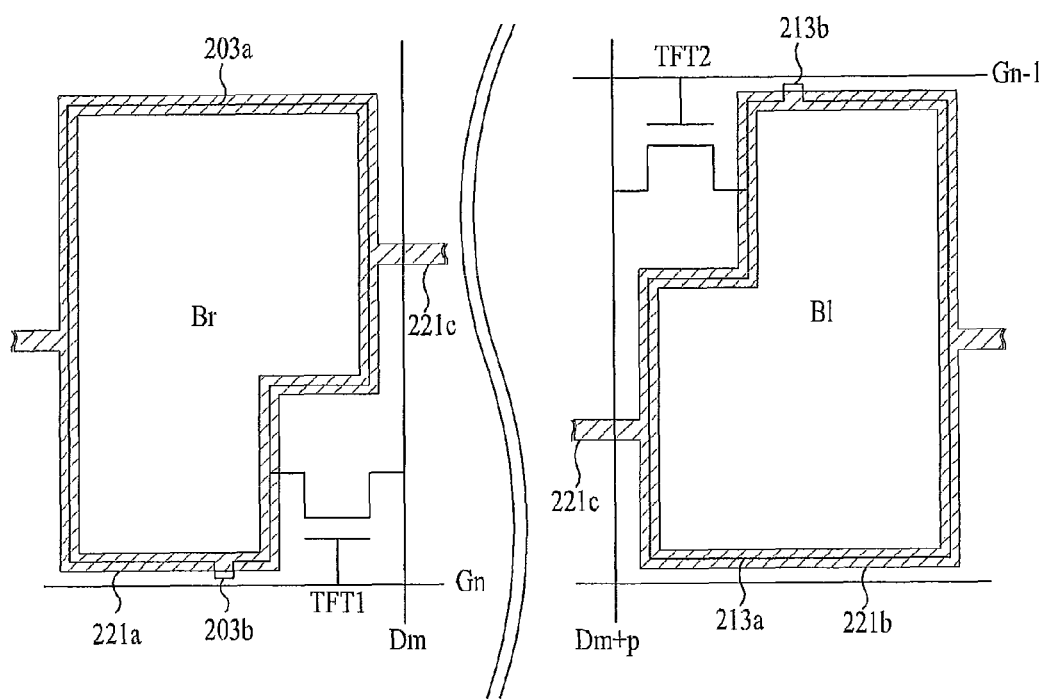
FIG. 3 illustrates a diagram showing a relation between a pixel electrode and a common line in each of two kinds of blue unit pixels for a liquid crystal display device of the present invention.

FIG. 3 illustrates a diagram showing a relation between a pixel electrode and a common line in each of two kinds of blue unit pixels for a liquid crystal display device of the present invention.

Figure 1:
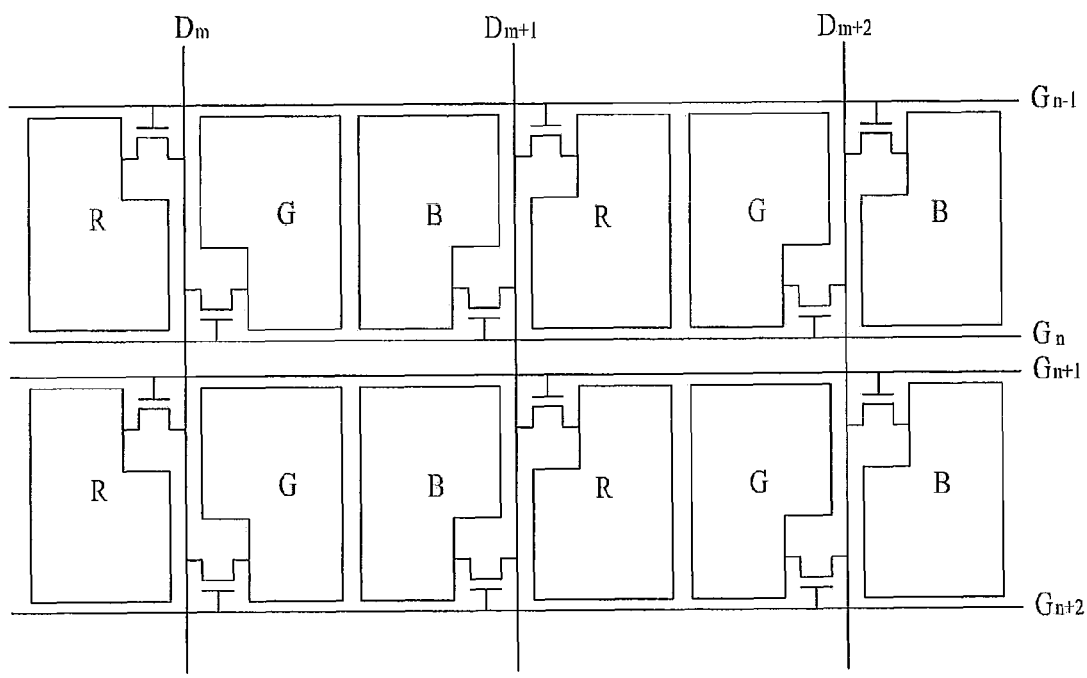
FIG. 1 illustrates a circuitry diagram of a general Z-type driving liquid crystal display device.
Figure 2:
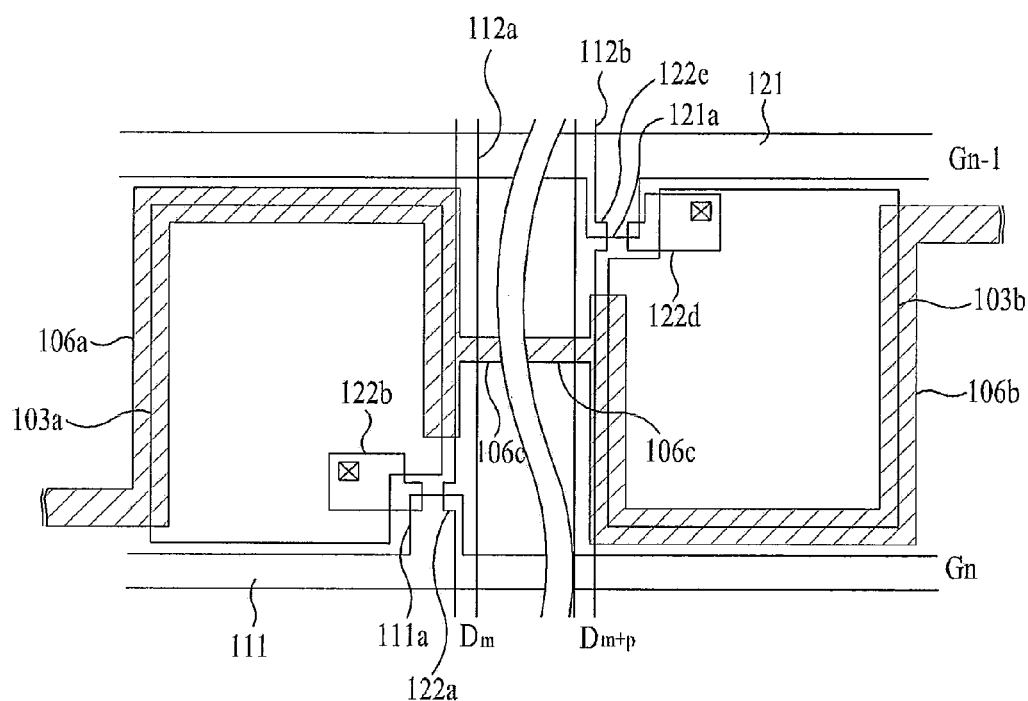
FIG. 2 illustrates a plan view of common lines for upper/lower side inverted pixels.

Alike the Z-type driving (a driving signal is applied to data lines in zigzag) liquid crystal display device shown in FIG. 1, the liquid crystal display device of the present invention has the following configuration.

Referring to FIG. 3, the liquid crystal display includes a matrix of unit pixels, wherein R (red), G (green), and B (blue) unit pixels form a pixel.

A pair of adjacent gate lines are formed in a first direction (transverse direction), spaced from each other by one unit pixel distance away.

Data lines are formed in a second direction perpendicular to the pair of gate lines spaced from each other by two unit pixel distances away in a longitudinal direction.

Thin film transistors are formed between gate lines and data lines different from each other at unit pixels on both sides of the data line.

The data line is formed at every second unit pixels, and the R, G, B unit pixels are repeated at every third unit pixels, wherein it can be known that the thin film transistor is arranged, not at the same positions for all the unit pixels of the same color, but in the same fashion repeatedly for every six pixels.

The six unit pixel has two R, G, B pixels respectively, wherein it can be known that positions of the thin film transistors for the two R unit pixels and two G unit pixels are, not only, different from each other in left side or right side thereof, but also positions of the thin film transistors for the B unit pixels are inverted both in an upper side and lower side, and in left side and right side.

Configuration of the B unit pixels having an upper/lower inverted structure will be review in detail. For convenience's sake, as shown in FIG. 3, a blue unit pixel having a thin film transistor on a lower side will be called as a first pixel, and a blue unit pixel having a thin film transistor on an upper side will be called as a second pixel In the liquid crystal display device, it can be noted that the first pixel having the thin film transistor on a lower side has a first thin film transistor TFT1 formed between a gate line 201 on the lower side and a data line crossing the gate line 201.

There is a first pixel electrode 203a connected to the first thin film transistor TFT1. The first pixel electrode 203a has a first neck portion 203b projected therefrom adjacent to the gate line Gn connected to the first thin film transistor TFT1.

There is a first common line 221a overlapped on an edge of the first pixel electrode 203a to form a close loop. Between layers of an overlapped portion of the first common line 221a and the first pixel electrode 203a, a storage capacitor is defined with a gate insulating film 234 in FIG. 5 and a protective film 235 between the first common line 221a and the first pixel electrode 203a.

The second pixel, having a thin film transistor formed at a position inverted in an up/down direction with respect to the first pixel, has a second thin film transistor TFT2 formed between a gate line Gn−1 on an upper side and a data line Dm+p crossing the gate line Gn−1.

There is a second pixel electrode 213a connected to the second thin film transistor TFT2. The second pixel electrode 213a has a second neck portion 213b projected therefrom adjacent to the gate line Gn−1 connected to the second thin film transistor TFT2.

There is a second common line 221b overlapped on an edge of the second pixel electrode 213a to form a close loop. Between layers of an overlapped portion of the second common line 221b and the second pixel electrode 213a, a storage capacitor is defined with a gate insulating film 234 in FIG. 5 and a protective film 235 between the second common line 221b and the second pixel electrode 213a.

Figure 4:
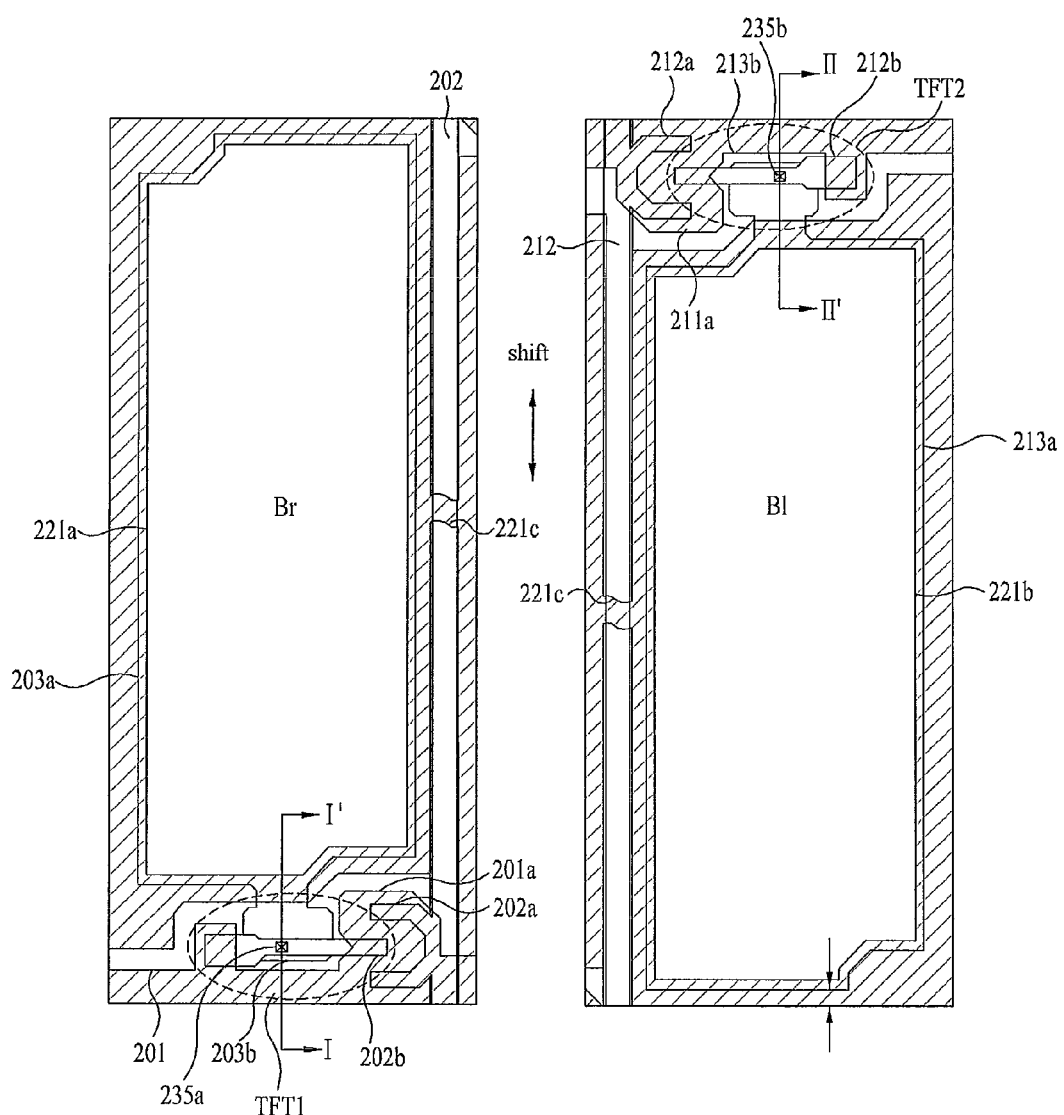
FIG. 4 illustrates a plan view showing two kinds of blue unit pixels for a liquid crystal display device of the present invention, in detail.
Figure 5A:
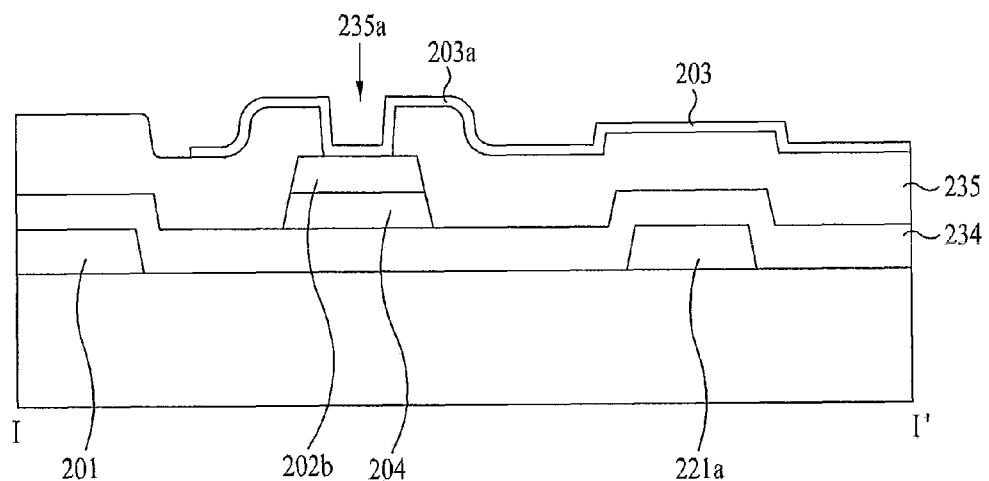
FIGS. 5A and 5B illustrate sections across I-I' line and II-II' line in FIG. 4, respectively.
Figure 5B:
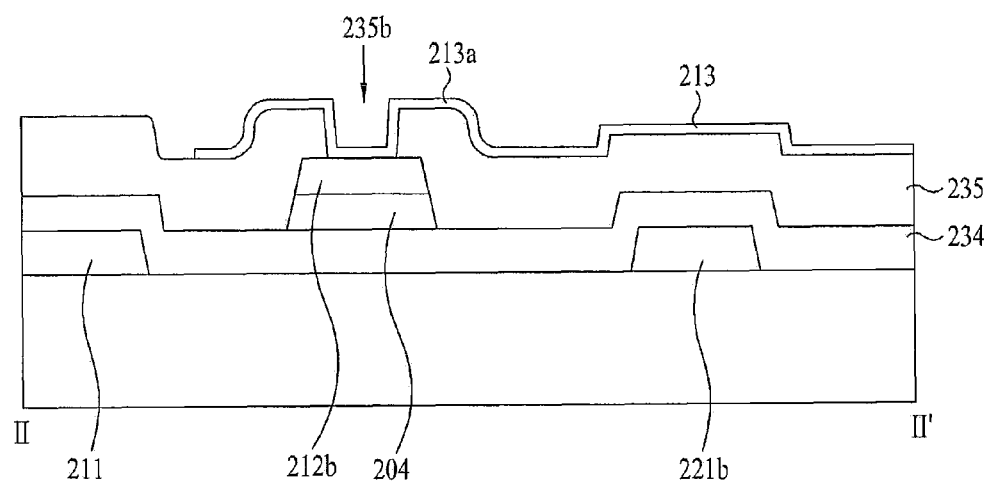

FIG. 4 illustrates a plan view showing two kinds of blue unit pixels for a liquid crystal display device of the present invention, and FIGS. 5A and 5B illustrate sections across an I-I' one and II-II' line in FIG. 4.

A blue unit pixel having a thin film transistor on a lower side will be called as a first pixel, and a blue unit pixel having a thin film transistor on an upper side will be called as a second pixel.

Referring to FIGS. 4 to 5B, the liquid crystal display device includes a substrate 100 having a matrix of pixel regions, and first and second gate lines 201 and 211 adjacent to each other running in a first direction on the substrate 100, a plurality of gate line pairs each having a second gate line 211 which is a previous line and a first gate line 201 which is a current line arranged spaced by one pixel distance away, a plurality of data lines 202 and 212 arranged in a second direction crossing the first direction at every second pixel regions, a first thin film transistor TFT1 formed at a first pixel region between the data lines 202 and 212 and the current gate line 201, a second thin film transistor TFT2 formed at a second pixel region between the data lines 202 and 212 and the previous gate line 211, a first pixel electrode 203a formed at the first pixel region connected to the first thin film transistor TFT1, having a first neck portion 203b projected therefrom toward the first gate line 201, a second thin film transistor TFT2 formed at a second pixel region between the data lines 202 and 212 and the previous gate line 211, a second pixel electrode 213a formed at the second pixel region connected to the second thin film transistor TFT2, having a second neck portion 213b projected therefrom toward the second gate line 211, and a first common line 221a or 221b overlapped with an edge of the first pixel electrode or second pixel electrode 203a or 213a to form a closed loop, having a connection portion 221c connected between the first and second pixel electrodes 203a and 213b.

In detail, it can be noted that the pixel electrode having the thin film transistor TFT1 on the lower side has the thin film transistor formed between the gate line 201 on the lower side and the data line 202 crossing the gate line 201.

The thin film transistor includes a first gate electrode 201a projected from the gate line 210 on the lower side, a first source electrode 202a projected from the data line 202 crossing the gate line 201 in a ⊃ shape overlapped with the gate electrode 201a, and a first drain electrode 202b spaced from the first source electrode 202a placed in the ⊃ shape of the first source electrode 202a. The ⊃ shape of the second first source electrode 202a enables to increase a W/L value of a channel region defined between the first source electrode 202a and the first drain electrode 202b for improving a channel characteristic.

Formed under the first source electrode 202a and the first drain electrode 202b, there is a semiconductor layer 204 having a channel defined at a region between the first source electrode 202a and the first drain electrode 202b.

The first pixel electrode 203a has a first neck portion 203b projected therefrom adjacent to the gate line connected to the thin film transistor, and layers of the first common line 221a and the first drain electrode 202b passes under the first neck portion 203b of the first pixel electrode.

The first common line 221a is formed on the same tier with the first gate line 201 overlapped with four side edges of the first pixel electrode 203a to form a closed loop, and connected to an adjacent unit pixel with the connection portion 221c.

With regard to relation between layers, the gate insulating film 234 is formed on a substrate 200 to cover the gate line 201, the first gate electrode 201a, the first common line 221a, and the connection portion 221c, the semiconductor layer 204 is formed on the gate insulating film 234, and the data line 202, the first source electrode 202a, and the first drain electrode 202b is formed on the semiconductor layer 204. The protective film 235 is formed on the gate insulating film 234 to cover the data line 202, the first source electrode 202a, and the first drain electrode 202b, the first pixel electrode 203a and the first neck portion 203b are formed on the protective film 235.

Contact between the first pixel electrode 203a and the first drain electrode 202b is formed as a first contact hole 235a is defined by removal of the protective film 235 from a portion of the first neck portion 203b where the first pixel electrode 203a and the first drain electrode 202b overlap.

In the meantime, a storage capacitor is defined at layers of the gate insulating film and the projective film at overlapped portion of the first pixel electrode 203a and the first neck portion 203b and the first common line 221a. In this case, the first common line 221a and the first pixel electrode 203a overlap at four side edges of the first pixel electrode 203a, to have almost the same widths on left/right sides of the first pixel electrode 203a. The first common line 221a overlap with the first pixel electrode 203a, to have almost the same widths on upper/lower sides of the first pixel electrode 203a at a flat portion thereof, and the first neck portion 203b adjacent to the gate line 201 on the lower side has an extension from the pixel electrode 203a passed through an entire width of the first common line 221a projected beyond the first pixel electrode 203a, such that the first neck portion 203b secures an adequate overlap area with the first common line 221a even if overlays take place in the up/down direction. The first neck portion 203b has a same width maintained at the time the first neck portion 203b passes through the first common line 221a. The width of overlap of the first neck portion 203b with the first common line 221a is about 8~12 μm, and can be formed smaller than this as far as the resolution permits.

The pixel structure and the second pixel of upper/lower side and left/right side inverted shape will be described with reference to a right side pixel in FIG. 3 and FIG. 4.

Referring to FIG. 3, the second pixel is an inversion of the first pixel in upper/lower side and left/right side. The second pixel is different only in view of the inversion, but a structure of layers is the same with the first pixel described before.

That is, in the second pixel, the thin film transistor is formed at a crossing portion between the gate line 211 on the upper side and the data line 212 crossing the gate line 211, and the thin film transistor includes a second gate electrode 211a projected from the gate line 211 on the upper side, a second source electrode 212a projected from the data line 212 crossing the gate line 211 to the second gate electrode 211a in a ⊂ shape and overlap therewith, and a second drain electrode 212b spaced from the second source electrode 212a and placed in the ⊂ shape of the second source electrode 212a.HHHH Formed under the second source electrode 212a and the second drain electrode 212b, there is a semiconductor layer 204 having a channel defined at a region between the second source electrode 212a and the second drain electrode 212b.

The second pixel electrode 213a has a second neck portion 213b projected therefrom adjacent to the gate line on the upper side connected to the thin film transistor, and layers of the second common line 221b and the second drain electrode 212b passes under the second neck portion 213b of the second pixel electrode.

The second common line 221b is formed on the same tier with the gate line 211 overlapped with four side edges of the second pixel electrode 213a to form a closed loop, and connected to an adjacent unit pixel with the connection portion 221c.

Contact between the pixel electrode 213a and the drain electrode 212b is formed as a second contact hole 235b is defined by removal of the protective film 235 from a portion of the first neck portion 203b where the second pixel electrode 213a and the second drain electrode 212b overlap.

In the meantime, a storage capacitor is defined at layers of the gate insulating film and the projective film at overlapped portion of the second pixel electrode 213a and the second neck portion 213b and the second common line 221b. In this case, the second common line 221b and the second pixel electrode 213a overlap at four side edges of the pixel electrode 213a, to have almost the same widths on left/right sides of the pixel electrode 213a. The second common line 221b overlaps with the second pixel electrode 213a, to have almost the same widths on upper/lower sides of the second pixel electrode 213a at a flat portion thereof, and the second neck portion 213b adjacent to the gate line 211 on the upper side has an extension from the pixel electrode 213a passed through an entire width of the second common line 221b projected beyond the second pixel electrode 213a, such that the second neck portion 213b secures an adequate overlap area with the second common line 221b even if overlays take place in the up/down direction.

A phenomenon taking place at the time the overlay takes place at the first pixel and the second pixel in the liquid crystal display device of the present invention will be described.

A case will be assumed, in which the overlay takes place between a layer of the pixel electrode and a layer of the common line/gate line. In the first pixel, if the layer of the pixel electrode 203a is overlaid toward an upper side of the layer of the common line/gate line in FIG. 4, an overlapped area of the first pixel electrode 203a with the first common line 221a is increased on the upper side greater than a normal alignment, and decreased on the lower side smaller that the normal alignment. However, it can be noted that the overlapped area is secured to a level almost the same with the normal alignment regardless of the taking place of the overlay at the first neck portion 203b extended downward beyond the first common line 221a on the lower side.

Alike the first pixel, in the second pixel at the time of overlay toward the upper side, the overlapped area between the second pixel electrode 203a and the second common line 221b is increased on the upper side, and the overlapped area is decreased on the lower side. In this instance, the overlapped area is secured to a level almost the same with the normal alignment regardless of the taking place of the overlay at the second neck portion 213b overlapped with the first common line 221b.

At the time of designing the neck portions 203b and 213b, the widths of the overlap portions with the common lines 221a and 221b are determined such that a same level of the overlapped area is secured even if the overlap takes place in either an up or down direction.

In this instance, the overlapped area increased thus on the upper side compensates for the overlapped area decreased thus on the lower side, permitting to have a fixed storage capacitance owing to the effect of compensation even rest of the portion other than the neck portions regardless of the overlays at the end, which is the same for the first and second pixels. Therefore, the liquid crystal display device of the present invention permits to maintain a fixed capacitance even between pixels having upper/lower inverted structure, enabling to prevent the dim block from taking place coming from a difference of storage capacitance of pixels.

If the layer of the pixel electrode overlays downward with respect to the layer of the common line/gate line in FIG. 3, in comparison to above description, an effect the same with above can be expected except that the overlapped areas of the pixel electrodes and the common lines are decreased on the upper side and increased on the lower side in the first and second pixels respectively, i.e., portions of the increase and decrease of the overlapped areas are opposite.

That is, even though the liquid crystal display device of the present invention has pixel structures different from each other, the neck portions of the first and second pixel secure almost the same levels of overlapped area regardless of the overlays, rest of the upper and lower regions except the neck portions have the same increased and decreased areas in the upper side and lower side between the first and second pixels, to make no difference of the storage capacitance of the pixels. According to this, an effect of storage capacitance balancing can be obtained between the pixels.

That is, in the liquid crystal display device of the present invention, even if the pixels of colors having an upper side/lower side inverted structure have a compensation effect owing to a symmetric structure thereof even if the overlay takes place in upper and lower sides or the left and right sides, permitting to have storage capacitance at a level similar to a normal alignment state despite of the overlay taken place, forming no difference of the storage capacitance between the inverted structures. The storage capacitance balancing effect is, not only applicable to the blue pixels, but also applicable to pixels of other colors in conformity with the structures of the first and second pixels.

That is, even for red, green, or white pixels, if the common line overlaps with the pixel electrodes for each of the pixels within a pixel in symmetry in upper and lower sides or left and right sides, a symmetric compensation effect can be obtained even if the overlay takes place in the upper and lower sides or left and right sides, permitting to maintain storage capacitance at a level equal or similar to a time of normal alignment, the dim block can be prevented.

As has been described, the liquid crystal display device and a method for manufacturing the same of the present invention have the following advantages.

The formation of common lines to overlap with respective pixel electrodes on upper/lower, left/right sides thereof at blue pixels having upside down inverted structures permits to prevent dim block from taking place even if overlays take place in the upper/lower, left/right sides, by making one side compensates the other side at the pixels, resulting to maintain values of storage capacitance to be the same between the pixels of inverted structures.

Second, the formation of the neck portion extended adjacent to the gate line connected to the thin film transistor of the pixel beyond the common line permits to secure the same level of storage capacitance at the neck portions even if the overlays take place owing to the extended portion, enabling to have an overlap margin between the common line and the pixel electrode.

The neck portion permits to maintain a storage capacitance balancing.

Fourth, the symmetry of the upside down inverted structures can be applied, not only to the blue pixels, but also other color pixels.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display device comprising:
a substrate having a matrix of pixel regions;
a plurality of gate line pairs each having a first gate line and a second gate line in a first direction, wherein a previous line of the second gate line and a current line of the first gate line are spaced by one pixel region away;
a plurality of data lines in a second direction, crossing the first direction at every two pixel regions;
a first thin film transistor formed at a first pixel region between the data lines and the current line of the first gate line;
a second thin film transistor formed at a second pixel region between the data lines and the previous line of the second gate line;
a first pixel electrode formed at the first pixel region connected to the first thin film transistor, having a first neck portion projected therefrom toward the first gate line;
a second pixel electrode formed at the second pixel region connected to the second thin film transistor, having a second neck portion projected therefrom toward the second gate line; and
a common line overlapped with an edge of the first pixel electrode and second pixel electrode to form a closed loop at each first pixel electrode and second pixel electrode, having a connection portion connected between the first and second pixel electrodes.

2. The liquid crystal display device as claimed in claim 1, wherein the first neck portion and the second neck portion are extended beyond the common line.

3. The liquid crystal display device as claimed in claim 2, wherein the first neck portion and the second neck portion have the same widths at portions the first neck portion and the second neck portion cross the common line.

4. The liquid crystal display device as claimed in claim 3, wherein the first neck portion and the second neck portion have a width of 8-12 micrometers at portions the first neck portion and the second neck portion cross the common line.

5. The liquid crystal display device as claimed in claim 1, wherein the first thin film transistor has an electric contact portion with the first neck portion, and the second thin film transistor has an electric contact portion with the second neck portion.

6. The liquid crystal display device as claimed in claim 1, wherein the first pixel electrode and the second pixel electrode are designed to overlap with the common line on left and right sides thereof by the same width, and overlap with the common line on upper and lower sides thereof by the same width except the first and second neck portions.

7. The liquid crystal display device as claimed in claim 1, wherein the first and second pixel regions are for pixels of the same color.

8. The liquid crystal display device as claimed in claim 1, wherein the plurality of pixel regions have red, green, blue repetitive lines in the second direction, and the blue pixels are formed at the first and second pixel regions.

9. A method for manufacturing a liquid crystal display device comprising the steps of:
providing a substrate having a matrix of pixel regions;
forming a plurality of gate line pairs each having a first gate line and a second gate line in a first direction on the substrate, wherein a previous line of the second gate line and a current line of the first gate line are spaced by one pixel region away, and a plurality of common lines each having close loop patterns with respect of pixel regions between the previous first gate line and the current gate line and a connection portion connected between the closed loop patterns;
depositing a gate insulating film on the substrate having the plurality of gate line pairs and the common line;
forming a plurality of data lines at every two pixel regions in the second direction crossing the first direction, a first thin film transistor at a first pixel region between the data lines and the current first gate line, and a second thin film transistor at a second pixel region between the data lines and the previous second gate line, by removing a semiconductor layer and a second metal on the gate insulating film selectively;
forming a protective film on the gate insulating film having the data line, first and second thin film transistors;
depositing a transparent electrode on the protective film and removing the transparent electrode selectively, to form a first pixel electrode at the first pixel region having a first neck portion projected toward the first gate line, and a second pixel electrode at the second pixel region having a second neck portion projected toward the second gate line.

10. The method as claimed in claim 9, wherein, after forming the protective film on an entire surface of the substrate in the step of forming a protective film, further comprising the step of removing the protective film to expose the first thin film transistor and the second thin film transistor overlapped with the first and second neck portions, to form first and second contact holes.

* * * * *